(12) United States Patent
Dhanraj et al.

(10) Patent No.: US 10,372,493 B2
(45) Date of Patent: Aug. 6, 2019

(54) THREAD AND/OR VIRTUAL MACHINE SCHEDULING FOR CORES WITH DIVERSE CAPABILITIES

(71) Applicant: Intel Corporation, Santa Clara, CA (US)

(72) Inventors: Vijay Dhanraj, Hillsboro, OR (US); Gaurav Khanna, Hillsboro, OR (US); Russell J. Fenger, Beaverton, OR (US); Monica Gupta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 14/978,182

(22) Filed: Dec. 22, 2015

(65) Prior Publication Data

US 2017/0177415 A1   Jun. 22, 2017

(51) Int. Cl.
*G06F 9/48* (2006.01)
*G06F 9/455* (2018.01)
*G06F 9/50* (2006.01)

(52) U.S. Cl.
CPC ........ *G06F 9/4881* (2013.01); *G06F 9/45558* (2013.01); *G06F 9/5038* (2013.01);
(Continued)

(58) Field of Classification Search
CPC .. G06F 9/5077; G06F 9/45558; G06F 9/5038; G06F 2009/4557; G06F 2009/45591; G06F 9/4881
See application file for complete search history.

(56) References Cited

U.S. PATENT DOCUMENTS 9,678,792 B2 * 6/2017 Doyle .................. G06F 9/4881
2010/0153956 A1   6/2010 Capps, Jr. et al.
(Continued)

FOREIGN PATENT DOCUMENTS

JP   2004-252900   9/2004
JP   2010-039923   2/2010
(Continued)

OTHER PUBLICATIONS

International Search Report and Written Opinion dated Feb. 17, 2017 for International Application No. PCT/US2016/062327, 13 pages.
(Continued)

*Primary Examiner* — Jacob D Dascomb
(74) *Attorney, Agent, or Firm* — Schwabe, Williamson & Wyatt, P.C.

(57) ABSTRACT

Apparatuses, methods and storage medium associated with scheduling of threads and/or virtual machines, are disclosed herein. In embodiments, an apparatus is provided with a scheduler of an operating system and/or a virtual machine monitor. The scheduler is to retrieve or receive capabilities of the cores of one or more multi-core processors of the apparatus with diverse capabilities, and schedule a plurality of threads for execution on selected one or ones of the cores, based at least in part on the capabilities of the cores and characteristics of the plurality of threads. The virtual machine monitor is to retrieve or receive capabilities of the cores, and schedule a plurality of virtual machines for execution on selected one or ones of the cores, based at least in part on the capabilities of the cores and respective priorities of the virtual machines. Other embodiments may be described and/or claimed.

20 Claims, 8 Drawing Sheets

(52) U.S. Cl.
CPC .......... *G06F 9/5044* (2013.01); *G06F 9/5077* (2013.01); *G06F 2009/4557* (2013.01); *G06F 2009/45591* (2013.01)

(56) References Cited

U.S. PATENT DOCUMENTS

| | | | | |
|---|---|---|---|---|
| 2011/0023047 A1* | 1/2011 | Memik | ................. | G06F 9/4843 718/104 |
| 2011/0161965 A1 | 6/2011 | Im et al. | | |
| 2012/0166763 A1* | 6/2012 | Henry | ................... | G06F 1/3206 712/40 |
| 2013/0247046 A1 | 9/2013 | Asai et al. | | |
| 2014/0007097 A1 | 1/2014 | Chin et al. | | |
| 2014/0068622 A1 | 3/2014 | Gmuender et al. | | |
| 2014/0237274 A1* | 8/2014 | Murakami | ............ | G06F 1/3243 713/320 |
| 2014/0325511 A1* | 10/2014 | Aasheim | ............. | G06F 9/45558 718/1 |
| 2014/0373025 A1* | 12/2014 | Kim | ........................ | G06F 9/505 718/104 |
| 2016/0357676 A1* | 12/2016 | Cain, III | ................... | G06F 9/48 |
| 2017/0090988 A1* | 3/2017 | Young | ................... | G06F 9/5038 |

FOREIGN PATENT DOCUMENTS

| | | |
|---|---|---|
| JP | 2012533827 A | 12/2012 |
| JP | 2014-032621 | 2/2014 |

OTHER PUBLICATIONS

Office Action dated Dec. 19, 2017 for Japanese Patent Application No. 2016-235553, 9 pages.

Tomoya Honzo et al., "A Task Allocation Strategy for Heterogeneous Server Systems with a Machine Learning Approach", Mar. 3, 2011, 11 pages.

* cited by examiner

THREAD AND/OR VIRTUAL MACHINE SCHEDULING FOR CORES WITH DIVERSE CAPABILITIES

TECHNICAL FIELD

The present disclosure relates to the field of computing. More particularly, the present disclosure relates to the thread and/or virtual machine scheduling method and apparatus for cores with diverse capabilities.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In-Die Variation (IDV) naturally produces multi-core processors with some cores that are better (higher performance or lower voltage) than others. Enumeration and use of these cores in accordance with their native capability may provide upside turbo performance that can be realized and marketed. Some multi-core processors, such as Intel® x64 multi-core processors, identify the cores that can run at frequencies higher than a standard frequency range. For the x64 multi-core processors, these identified higher performance cores are called Favored Cores, and the hardware feature is called Asymmetric Core Turbo (ACT).

Existing operating system (OS) software is not aware of this implicit heterogeneity in the performance capability of the various cores. Thus, to exploit the feature, a system administrator has to use a white list to manually identify important, performance sensitive or otherwise high priority execution threads, and a driver is employed to establish affinity between the threads in the white list and the Favored Cores.

The main disadvantage is that the administrator needs to keep updating the white-list for different scenarios/workloads, which is not a scalable solution at all. Also, often user applications could establish affinity for other workloads (not in the white list) with the Favored Cores, thereby causing adverse performance impacts.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with scheduling threads and/or virtual machines, are disclosed herein. In embodiments, an apparatus may include one or more multi-core processors, each having a plurality of cores of diverse capabilities. Further, the apparatus may be provided with a scheduler of an operating system and/or a virtual machine monitor. The scheduler may be configured to retrieve or receive capabilities of the cores, and schedule a plurality of execution threads of the apparatus for execution on selected one or ones of the cores, based at least in part on the capabilities of the cores and characteristics of the plurality of execution threads. The virtual machine monitor may be configured to retrieve or receive capabilities of the cores, and schedule a plurality of virtual machines of the apparatus for execution onto selected one or ones of the cores, based at least in part on the capabilities of the cores and respective priorities of the virtual machines.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "core" refers to the processor core of a multi-core processor. The term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
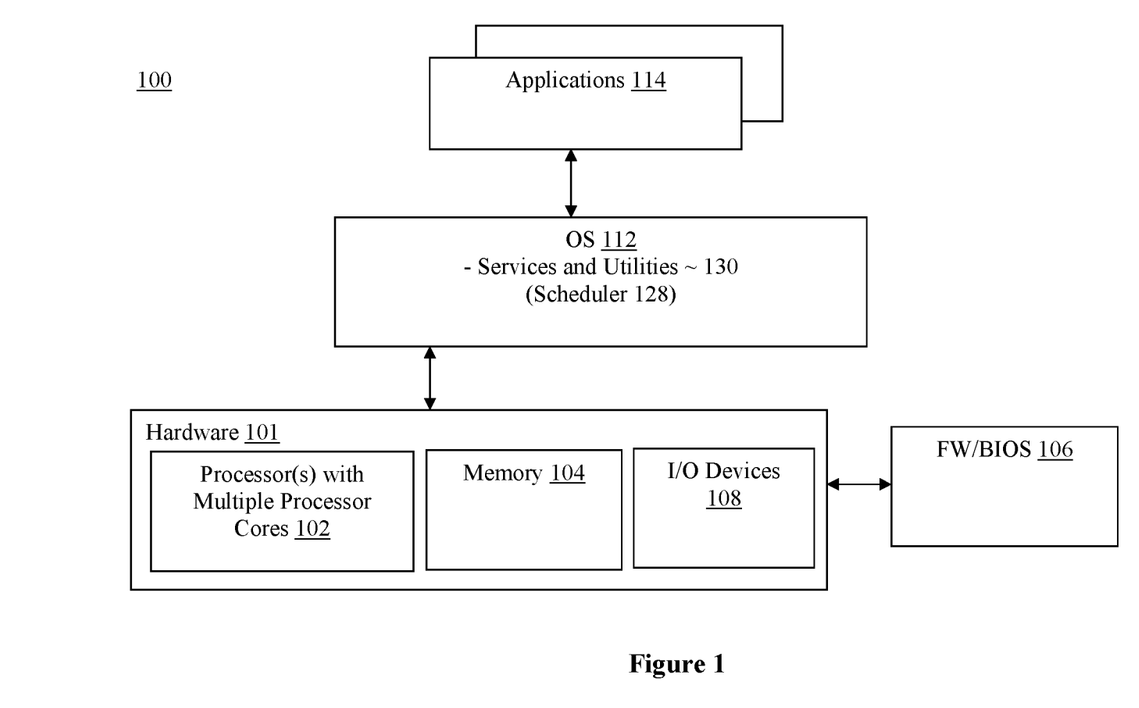
FIG. 1 illustrates an example computing device having the thread scheduling technology of the present disclosure, according to various embodiments.

Referring now to FIG. 1, wherein a computing device having the thread and/or virtual machine scheduling technology of the present disclosure, according to various embodiments, is shown. As illustrated, in embodiments, computing device 100 may include hardware 101, firmware (FW)/basic input/output services (BIOS) 106, OS 112 and applications 114, operatively coupled with each other as shown. Hardware 101 may include one or more multi-core processors 102, each with multiple cores of diverse capabilities, some higher than others. Examples of core capabilities may include, but are not limited to, maximum operating frequencies, and/or voltages. OS 112 may include a number of services and utilities 130. Applications 114 and/or OS 112 may have one or more execution threads (may also simply referred to as threads). Services and utilities 130 may include services/utilities, such as memory management, input/output (I/O) devices allocation, and so forth. In particular, services and utilities 130 may include a scheduler 128 configured to schedule execution of the execution threads of OS 112 and applications 114 in selected ones of the cores of multi-core processor(s) 102. As will be described in more details below, scheduler 128 may be configured with the execution thread scheduling technology of the present disclosure to schedule execution of the execution threads in selected one or ones of the cores of multi-core processor(s) 102, based at least in part on the capabilities of the cores, and the characteristics of the execution threads. Examples of characteristics of the execution threads may include, but are not limited to, static characteristics, such as whether a thread is to be executed in foreground or background, or its assigned priority, and dynamic characteristics, such as whether a thread is a long running thread in excess of an execution time threshold, or a thread with large number of prefetches in excess of a prefetch threshold, and so forth. In embodiments, scheduler 128 may be configured to schedule execution of the execution threads in selected set or sets of the cores of multi-core processor(s) 102, with each set having one or more cores, based at least in part on the capabilities of the core sets, and the characteristics of the execution threads. Resultantly, certain execution threads, such as more important, more critical, more performance sensitive, or more computational intensive execution threads may be automatically scheduled for execution on more capable cores or core sets, without requiring system administrator intervention. These and other aspects related to core capabilities based execution thread scheduling will be further described below with references to FIGS. 2-4.

Except for the exploitation of the cores with higher capabilities, multi-core processor(s) 102 may otherwise be any one of a number of multi-core processors known in the art. In embodiments, hardware 101 may further include memory 104, I/O devices 108, or other elements (not shown). Memory 104 may be any known volatile or non-volatile memory in the art, suitable for storing data. Memory 104 may include a hierarchy of cache memory and system memory. Both the cache and system memory may be respectively organized into cache pages and memory pages. Examples of I/O devices 108 may include communication or networking interfaces, such as Ethernet, WiFi, 3G/4G, Bluetooth®, Near Field Communication, Universal Serial Bus (USB) and so forth, storage devices, such as solid state, magnetic and/or optical drives, input devices, such as keyboard, mouse, touch sensitive screen, and so forth, and output devices, such as, display devices, printers, and so forth.

FW/BIOS 106 may be any one of a number FW/BIOS known in the art. Except for scheduler 128 equipped with core capability and/or thread characteristics based execution thread scheduling of the present disclosure, OS 112 may likewise be any one of a number of OS known in the art, e.g., the Windows OS from Microsoft® Corporation. Similarly, applications 114 may be any one of a number of applications known in the art.

Figure 2:
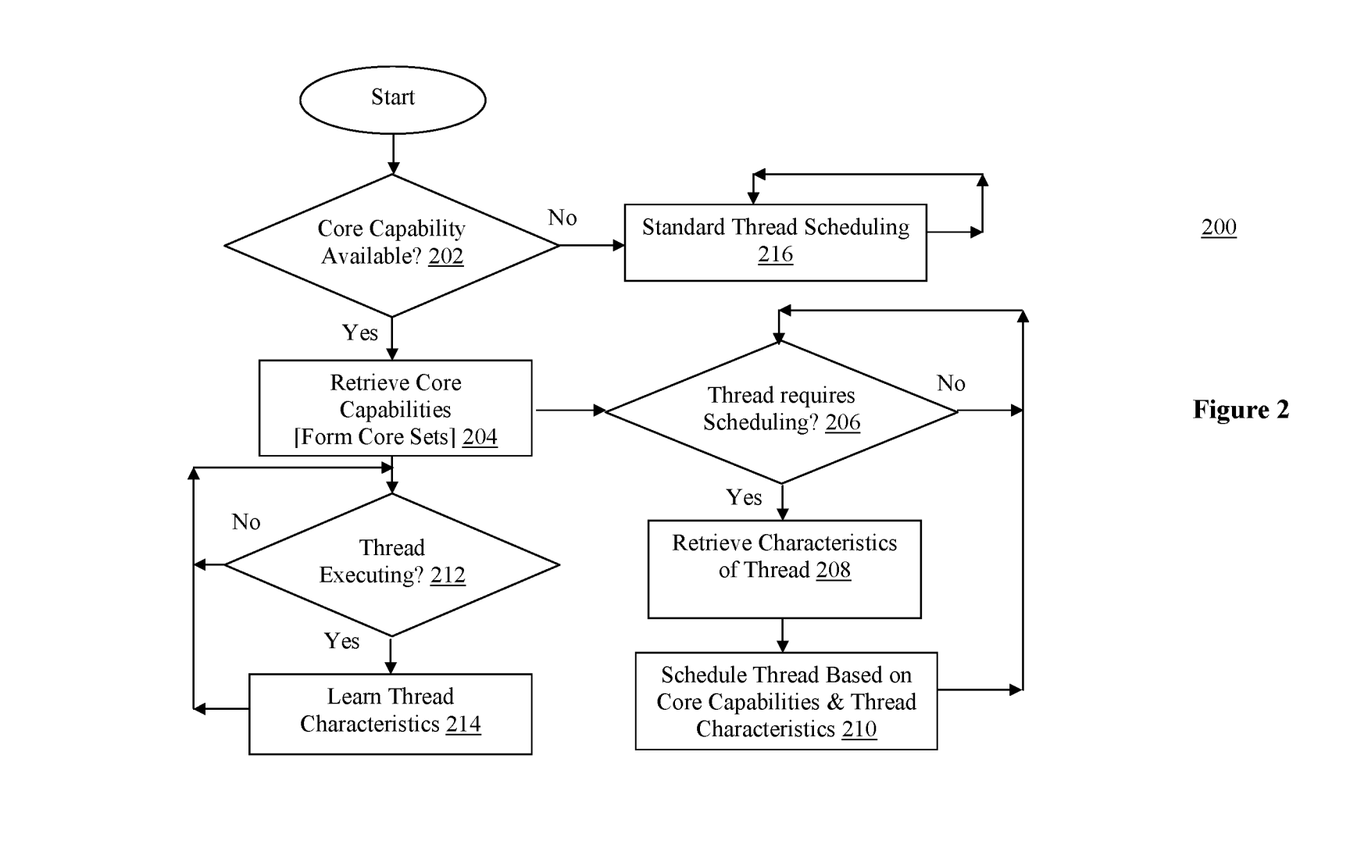
FIG. 2 illustrates an example process for scheduling execution threads, according to the various embodiments.

Referring now to FIG. 2, wherein an example process for scheduling execution of threads, according to the various embodiments, is shown. As illustrated, process 200 for core capability and/or thread characteristics based scheduling of execution threads may include operations performed at block 202-216. The operations at blocks 202-216 may be performed by e.g., scheduler 128 of FIG. 1 (executed by one or more processor cores of multi-core processor 102).

Process 200 may start at block 202. At block 202, a determination may be made on whether core capability information is available. When performed by scheduler 128, the determination may be e.g., on startup of scheduler 128. In embodiments, the determination may be made by accessing the identification of the multi-core processor, which may implicitly convey whether core capability information are available, e.g., from the respective processor cores.

Figure 3:
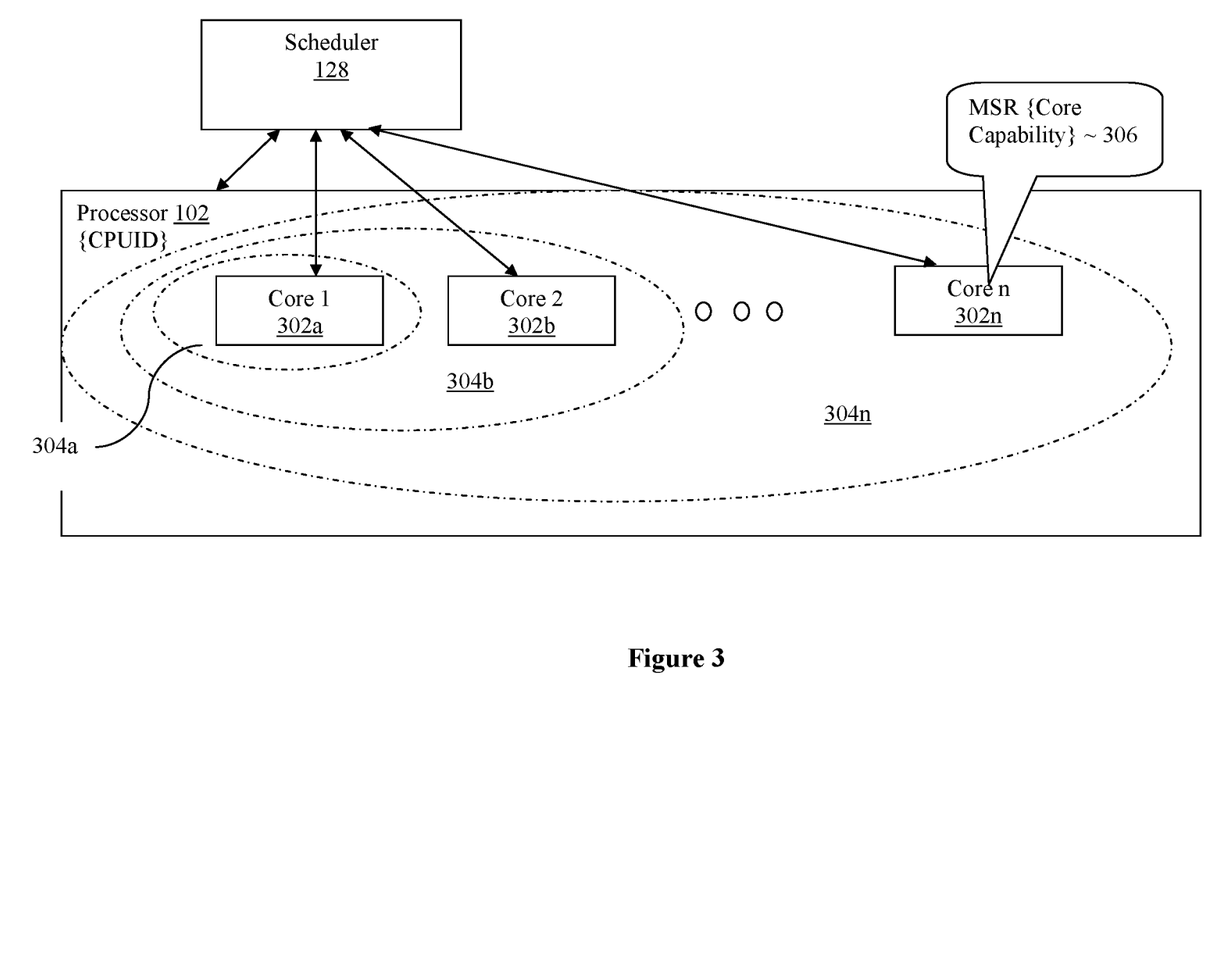
FIG. 3 illustrates the concepts of processor identification and capability ranked core sets, according to various embodiments.

Referring now to FIG. 3, wherein the concepts of processor identification and capability ranked core set, according to some embodiments, are illustrated. As illustrated, multi-core processor 102 may include n cores 302a-302n. Further, multi-core processor 102 may be configured with an identification, e.g., CPUID. In embodiments, the identification may inform scheduler 128 whether core capability information of the various cores 302a-302n, such as frequencies, voltages, and so forth, are available. For the embodiments, core capability information of the various cores 302a-302n may be respectively stored in designated control registers 306, e.g., the model specific register (MSR), of the various cores 302a-302n.

Referring back to FIG. 2, on determining that core capability information are available, process 200 may proceed to block 204. At block 204, the respective core capabilities may be read and retrieved from the various cores (e.g., for the embodiments of FIG. 3, from the respective control registers 306). In some embodiments, on retrieval of the respect core capabilities, the cores may also be logically ranked by their capabilities, and identified by their rankings. Further, the capability ranked and identified cores may be further logically organized into capability ranked core sets, with each core set having one or more capability ranked cores.

Referring to FIG. 3 again, as shown, cores may be logically ranked, ordered and identified as Core 1, Core 2, . . . Core n, 302a-302n, according to their capabilities. For the illustrated embodiments, Core 1 302a is the most capable, Core 2 302b is the next most capable . . . , and so forth, among the various cores 302a-302n. Then, Core Set 1 304a may be logically formed with Core 1 302a; Core Set 2 304b may be logically formed with Core 1 302a and Core 2 302b, . . . , and ultimately Core Set n 304n may be logically formed with all n cores 302a-302n. Accordingly, Core Set 1 304a has the singular most capable core, Core Set 2 304b has the two most capable cores, and so forth.

Returning to FIG. 2 again, from block 204, process 200 may split into two parallel branches, a scheduling branch and a learning branch, and proceed to blocks 206 and 212 respectively. For the scheduling branch, at block 206, a determination may be made on whether there is at least one thread that requires scheduling. If all threads have been scheduled, the scheduling branch of process 200 may loop at block 206 until there is at least one thread to be scheduled. On determination that there is at least one thread to be scheduled, process 200 may proceed to block 208. At block 208, previously learned characteristics of the next execution threads to be scheduled, if available, may be retrieved. Learned characteristics of execution threads to be scheduled may be stored e.g., in a control section of the thread or a persistent data structure, such as, a persistent data structure associated with scheduler 128.

Next at block 210, the thread may be scheduled for execution on selected individual core or core sets, based at least in part on the core capabilities and/or thread characteristics. Example embodiments of the operations at block 210 will be further described below with references to FIG. 4. Thereafter, the scheduling branch of process 200 may return to block 206 and continues there from as earlier described. The operations at blocks 206-210 may be repeated as long as system 100 is operating.

For the learning branch, at block 212, a determination may be made if there are threads executing. If there is no thread executing, the leaning branch of process 200 may loop at block 212 until there is at least one thread executing. On determination that there is at least one thread executing, the learning branch of process 200 may proceed to block 214. At 214, the dynamic characteristics of the executing threads. such as but not limited to running time, number of prefetches, and so forth, may be learned and updated. Thereafter, the learning branch of process 200 may return to block 212 and continues there from as earlier described. The operations at blocks 212-214 may be repeated as long as system 100 is operating.

In embodiments, the core capability or capabilities of one or more cores, such as frequencies or voltages, may be reconfigured/adjusted by a system administrator during operation. For these embodiments, the updated core capabilities may be provided e.g., through a notification (such as an interrupt) to the scheduler. On receipt, if necessary, the capability ordered core sets may be re-formed. Thereafter, the scheduling branch of process 200 may proceed as earlier described, using the updated core capabilities.

Back at block 202, if a result of the determination indicates that core capability information are not available, process 200 may proceed to block 216. At block 216, scheduling of execution of threads may proceed as in the prior art, without taking into consideration the core capabilities and/or characteristics of the threads. The operations at block 216 may be repeated as long as system 100 is operating.

Figure 4:
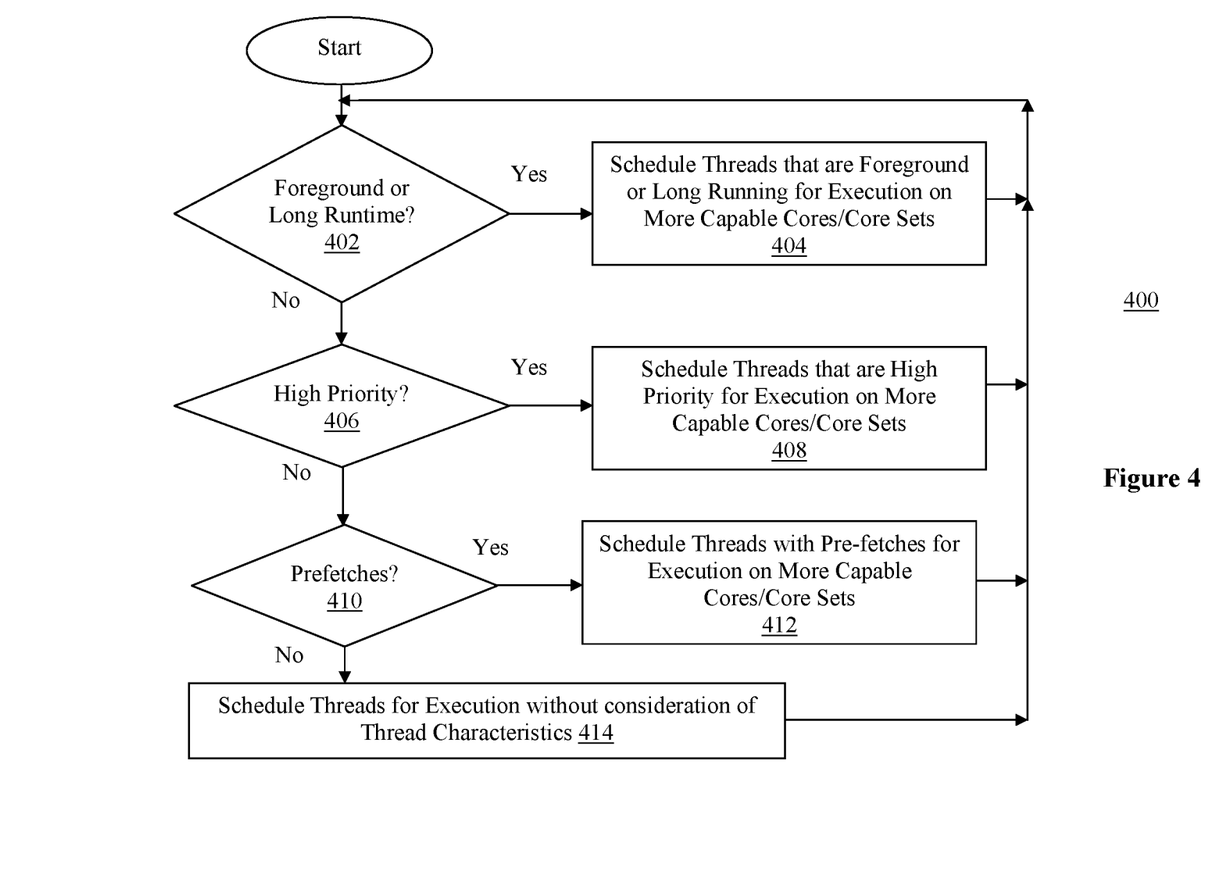
FIG. 4 illustrates an example process for scheduling execution of threads based on thread characteristics and cores or core sets capabilities, according to the various embodiments.

Referring now to FIG. 4, wherein an example process for scheduling thread execution based at least in part on core capabilities and/or thread characteristics, according to the various embodiments, is shown. As illustrated, process 400 for scheduling thread execution based at least in part on core capabilities and/or thread characteristics may include operations performed at block 402-414. The operations at blocks 402-414 may be performed by e.g., scheduler 128 of FIG. 1 (executed by one or more cores of multi-core processor 102).

Process 400 may start at block 402. At block 402, a determination may be made on whether an execution thread is to be executed in the foreground, a long running thread, or both. In embodiments, the running time threshold for a thread to be considered a long running thread may be defaulted or configurable by an administrator. On determining that an execution thread is to be executed in the foreground, and/or a long running thread, process 400 may proceed to block 404 and schedule the thread to execute in more capable cores. The capability level of the cores assigned may be in accordance with one or more defaulted operational policies or customized by a system administrator. On scheduling, process 400 may return to block 402 for the next thread to be scheduled.

If a result of the determination at block 402 is negative, process 400 may proceed to block 406. At block 406, a determination may be made on whether a thread has been assigned a high priority (e.g., by the OS). In embodiments, the priority threshold for a thread to be considered having been assigned a high priority may similarly be a defaulted threshold or configured by an administrator. On determining that an execution thread is a high priority thread, process 400 may proceed to block 408 and schedule the thread for execution in more capable cores. Similarly, the capability level of the cores assigned may be in accordance with one or more defaulted operational policies or customized by a system administrator. On scheduling, process 400 may return to block 402 for the next thread to be scheduled.

If a result of the determination at block 406 is negative, process 400 may proceed to block 410. At block 410, a determination may be made on whether a thread perform an amount of prefetches in excess of a prefetch threshold during execution. On determining that an execution thread performs prefetches in excess of the prefetch thresholds during execution, process 400 may proceed to block 412 and schedule the thread to execute in more capable cores. The capability level of the cores assigned may be in accordance with one or more defaulted operational policies or customized by a system administrator. On scheduling, process 400 may return to block 402 for the next thread to be scheduled.

If a result of the determination at block 410 is negative, process 400 may proceed to block 414. At block 414, the thread may be scheduled for execution without consideration of its characteristics, e.g., just based on core or core set capability and/or availability. On scheduling, process 400 may return to block 402 for the next thread to be scheduled.

While FIG. 4 illustrated three types of threads to be scheduled for execution on more capable cores, in alternate embodiments, more or less types of threads may be scheduled for execution on more capable cores.

Thus, with references to FIGS. 1-4, apparatuses, methods and storage medium associated with thread scheduling based at least in part on core capabilities and/or thread characteristics for a native execution environment has been described.

Figure 5:
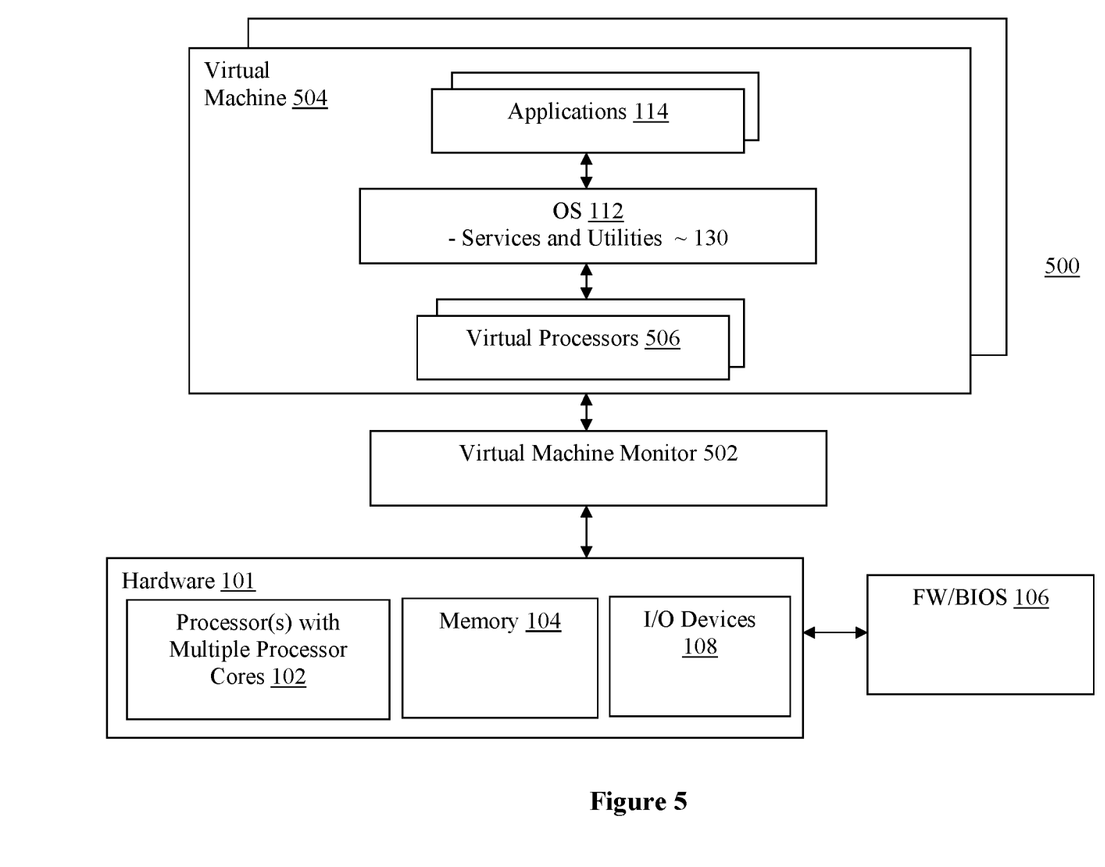
FIG. 5 illustrates an example computing device having the virtual machine scheduling technology of the present disclosure, according to various embodiments.

Referring now to FIG. 5, wherein an example computing device having the virtual machine scheduling technology of the present disclosure, according to various embodiments, is shown. As illustrated, similar to computing device 100, computing device 500 may include hardware 101 (having multi-core processor(s) 102), memory 104, and I/O devices 108), and FW/BIOS 106. Further, computing device 500 may also include applications 114 and OS 112 (with system and utilities 130). However, the various applications 114 and OS 112 are located in various virtual machines 504, each having one or more virtual processors 506, that are scheduled for execution on selected ones of the cores of processor 102. Still further, computing device 500 may be configured with virtual machine monitor (VMM) 502 to monitor and manage operation of the virtual machines 504. VMM 502 may be configured to perform its traditional functions, including but not limited to mapping virtual processors 506 to selected ones of the cores of processor 102, and virtual memory of VM 504 to memory 104. In embodiments, VMM 502 may be configured with the virtual machine scheduling technology of the present disclosure that schedules virtual machines for execution on selected ones of the processor cores of processor 102, based at least in part on capabilities of the cores and priorities of the virtual machines 504.

Figure 6:
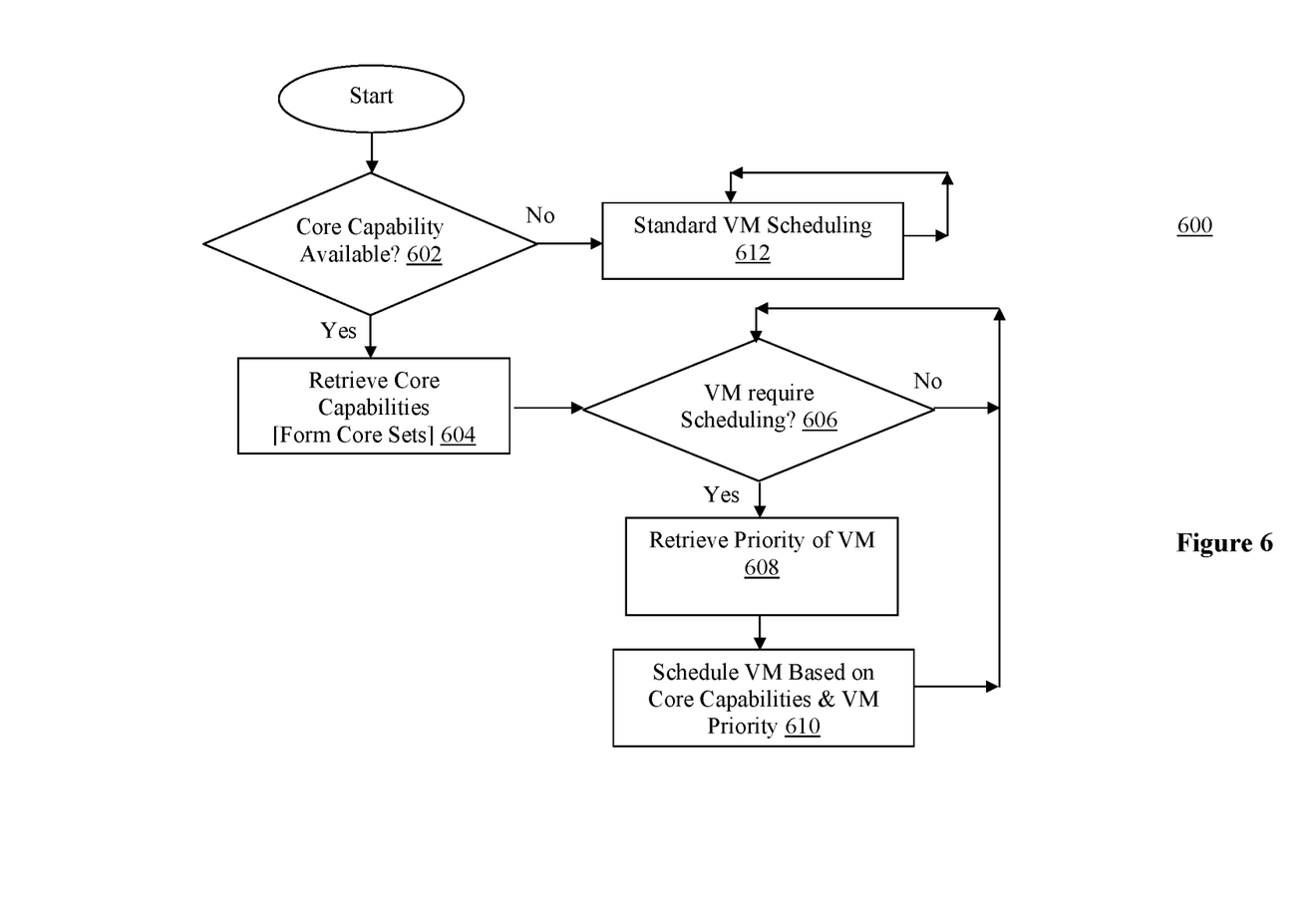
FIG. 6 illustrate an example process for scheduling virtual machines, according to various embodiments.

Referring now to FIG. 6, wherein an example process for scheduling virtual machines for execution, according to various embodiments, is shown. As illustrated, process 600 for core capabilities based scheduling of virtual machines may include operations performed at blocks 602-612. The operations at blocks 602-612 may be performed by e.g., VMM 502 of FIG. 5 (executed by one or more cores of multi-core processor 102).

Process 600 may start at block 602. At block 602, a determination may be made on whether core capability information is available. When performed by VMM 502, the determination may be e.g., on startup of VMM 502. In embodiments, the determination may be made by accessing the identification of the multi-core processor, which may implicitly convey whether core capability information is available, e.g., from the respective processor cores. In embodiments, as earlier described, VMM 502 may read the CPUID of the multi-core processor, and infer from the CPUID whether core capability information is available.

On determining that core capability information are available, process 600 may proceed to block 604. At block 604, the respective core capabilities may be read and retrieved from the various processor cores (e.g., for the embodiments of FIG. 3, as earlier described, from the respective control registers 306, such as MSR). In some embodiments, similar to earlier described scheduler embodiment for native execution, on retrieval of the respect core capabilities, the processor cores may also be logically ranked by their capabilities, and identified by their rankings. Further, the capability ranked and identified cores may be further logically organized into capability ranked processor core sets, with each core set having one or more cores.

Next, at block 606, a determination may be made on whether there is at least one VM that requires scheduling. If all VM have been scheduled, process 600 may loop at block 606 until there is at least one VM to be scheduled. On determination that there is at least one VM to be scheduled, process 600 may proceed to block 608. At block 608, priorities of the VMs, as assigned by the OS, may be retrieved. In embodiments, the priorities of the VMs as assigned by the OS may be stored in respective control sections of the VMs or in a persistent control data structure associated with the OS.

Next at block 610, the VM may be scheduled for execution on selected individual core or core sets, based at least in part on the core capabilities and/or the priority of the VM. Thereafter, process 600 may return to block 606 and continues there from as earlier described. The operations at blocks 606-610 may be repeated as long as system 100 is operating.

In embodiments, the core capability or capabilities of one or more cores, such as frequencies or voltages, may be reconfigured/adjusted by a system administrator during operation. For these embodiments, the updated core capabilities may be provided e.g., through a notification (such as an interrupt) to the VMM. On receipt, if necessary, the capability ordered core sets may be re-formed. Thereafter, process 600 may proceed as earlier described, using the updated core capabilities.

Back at block 602, if a result of the determination indicates that core capability are not available, process 600 may proceed to block 612. At block 612, scheduling of execution of VM may proceed as in the prior art, without taking into considerations of the core capabilities and/or priority of the VM. The operations at block 612 may be repeated as long as system 100 is operating.

Thus, with references to FIGS. 5-6, apparatuses, methods and storage medium associated with core capabilities based scheduling of VM for a virtualized execution environment has been described.

Figure 7:
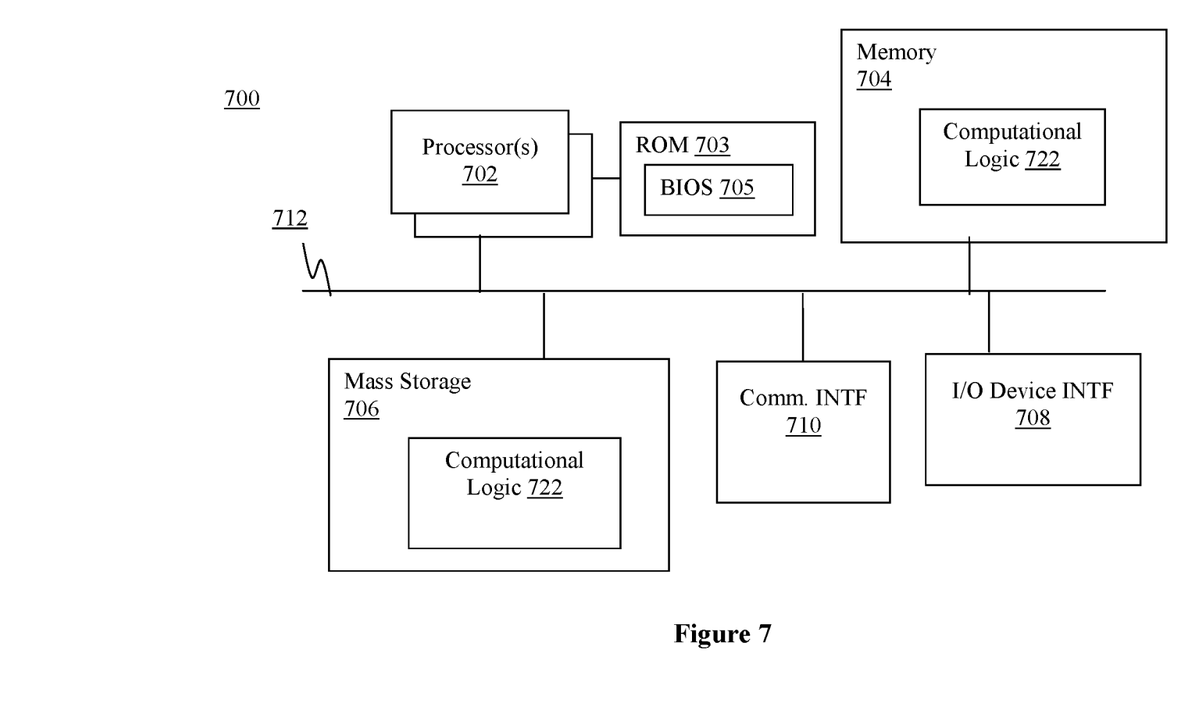
FIG. 7 illustrates an example computer system suitable for use to practice aspects of the present disclosure, according to various embodiments.

FIG. 7 illustrates an example computing device that may be suitable for use to practice selected aspects of the present disclosure. As shown, computer device 700 may include one or more processors or processor cores 702, read-only memory (ROM) 703, and system memory 704. Additionally, computing device 700 may include mass storage devices 706. Example of mass storage devices 706 may include, but are not limited to, tape drives, hard drives, compact disc read-only memory (CD-ROM) and so forth). Further, computer device 700 may include input/output devices 708 (such as display, keyboard, cursor control and so forth) and communication interfaces 710 (such as network interface cards, modems and so forth). The elements may be coupled to each other via system bus 712, which may represent one or more buses. In the case of multiple buses, they may be bridged by one or more bus bridges (not shown).

Each of these elements may perform its conventional functions known in the art. In particular, ROM 703 may include basic input/output system services (BIOS) 705, including scheduler 128 and/or VMM 502, as earlier described. System memory 704 and mass storage devices 706 may be employed to store a working copy and a permanent copy of the programming instructions implementing the operations associated with scheduler 128 and/or VMM 502, as earlier described, collectively referred to as computational logic 722. The various elements may be implemented by assembler instructions supported by processor(s) 702 or high-level languages, such as, for example, C, that can be compiled into such instructions.

The number, capability and/or capacity of these elements 710-712 may vary, depending on whether computing device 700 is used as a mobile device, such as a wearable device, a smartphone, a computer tablet, a laptop and so forth, or a stationary device, such as a desktop computer, a server, a game console, a set-top box, an infotainment console, and so forth. Otherwise, the constitutions of elements 710-712 are known, and accordingly will not be further described.

Figure 8:
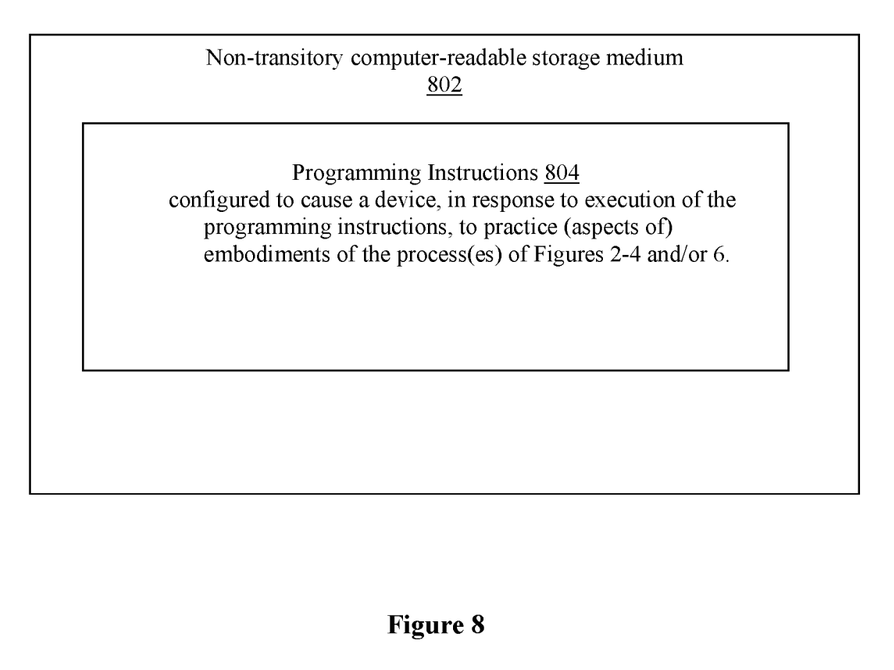
FIG. 8 illustrates a storage medium having instructions for practicing methods described with references to FIGS. 2-4 and 6, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 802 may include a number of programming instructions 704. Programming instructions 804 may be configured to enable a device, e.g., computing device 700, in response to execution of the programming instructions, to implement scheduler 128 and/or VMM 502. In alternate embodiments, programming instructions 804 may be disposed on multiple computer-readable non-transitory storage media 802 instead. In still other embodiments, programming instructions 804 may be disposed on computer-readable transitory storage media 802, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instruction for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 7, for one embodiment, at least one of processors 702 may be packaged together with memory having aspects of scheduler 128 and/or VMM 502. For one embodiment, at least one of processors 702 may be packaged together with memory having aspects scheduler 128 and/or VMM 502, to form a System in Package (SiP). For one embodiment, at least one of processors 702 may be integrated on the same die with memory having aspects of scheduler 128 and/or VMM 502. For one embodiment, at least one of processors 602 may be packaged together with memory having aspects of scheduler 128 and/or VMM 502, to form a System on Chip (SoC). For at least one embodiment, the SoC may be utilized in, e.g., but not limited to, a smartphone or computing tablet.

Thus various example embodiments of the present disclosure have been described including, but are not limited to:

Example 1 may be an apparatus for computing, comprising: one or more multi-core processors, each having a plurality of cores of diverse capabilities; and either a scheduler of an operating system or a virtual machine monitor; wherein the scheduler may retrieve or receive capabilities of the cores, and schedule a plurality of execution threads for execution on selected one or ones of the cores, based at least in part on the capabilities of the cores and characteristics of the plurality of execution threads; and wherein the virtual machine monitor may retrieve or receive capabilities of the cores, and schedule a plurality of virtual machines of the apparatus for execution on selected one or ones of the cores, based at least in part on the capabilities of the cores and respective priorities of the virtual machines.

Example 2 may be example 1, wherein the scheduler or the virtual machine monitor may further determine, on start-up or reset of the apparatus, whether capabilities of the cores are available to be retrieved, and on determination that the capabilities of the cores are available to be retrieved, perform the retrieval, and on retrieval of the core capabilities, perform the scheduling based at least in part on the capabilities of the cores and characteristics of the plurality of execution threads or priorities of the virtual machines.

Example 3 may be example 2, wherein the scheduler or the virtual machine monitor may determine whether capabilities of the cores are available by checking respective processor identification(s) of the one or more multi-core processors.

Example 4 may be example 3, wherein the scheduler or the virtual machine monitor may retrieve the capabilities of the cores from respective registers of the cores.

Example 5 may be example 1, wherein the scheduler or the virtual machine monitor on retrieval of the capabilities of the cores, may form one or more capability ordered core sets based at least in part on the capabilities of the cores.

Example 6 may be example 5, wherein on formation of the one or more capability ordered core sets, the scheduler or the virtual machine monitor may schedule the plurality of execution threads or virtual machines for execution on selected one or ones of the capability ordered core sets, based at least in part on the capabilities of the capability ordered core sets and characteristics of the plurality of execution threads or priorities of the virtual machines.

Example 7 may be example 1, wherein the scheduler may further learn the characteristics of the plurality of execution threads.

Example 8 may be example 7, wherein the scheduler may schedule execution threads that execute in a foreground with expected execution time in excess of an execution time threshold for execution in more capable cores or core sets.

Example 9 may be example 7, wherein the scheduler may schedule execution threads with priorities in excess of a priority threshold for execution in more capable cores or core sets.

Example 10 may be example 7, wherein the scheduler may schedule execution threads that perform pre-fetches in excess of a prefetch threshold in more capable cores or core sets.

Example 11 may be any one of examples 7-10, wherein on learning more about the characteristics of the execution threads, the scheduler may perform the scheduling based at least in part on the capabilities of the cores and the better understanding of the characteristics of the plurality of execution threads.

Example 12 may be any one of examples 1-10, wherein on receipt of one or more updates to one or more capabilities of one or more cores, the scheduler or the virtual machine monitor may perform the scheduling based at least in part on the updated capabilities of the cores and characteristics of the plurality of execution threads or priorities of the virtual machines.

Example 13 may be a method for computing, comprising: retrieving or receiving, by a scheduler of an operating system or a virtual machine monitor of a computing device, capabilities of a plurality of cores of one or more multi-core processors of the computing device, wherein the plurality of cores have diverse capabilities; and scheduling, by the scheduler, a plurality of execution threads for execution on selected one or ones of the cores, based at least in part on the capabilities of the cores and characteristics of the plurality of execution threads, or scheduling, by the virtual machine monitor, a plurality of virtual machines of the computing device for execution on selected one or ones of the cores, based at least in part on the capabilities of the cores and priorities of the virtual machines.

Example 14 may be example 13, further comprising determining, by the scheduler or the virtual machine monitor, on start-up or reset of the computing device, whether capabilities of the cores are available to be retrieved, and on determining that the capabilities of the cores are available to be retrieved, performing the retrieval; and on retrieval of the core capabilities, performing the scheduling based at least in part on the capabilities of the cores and characteristics of the plurality of execution threads or priorities of the virtual machines.

Example 15 may be example 14, wherein determining whether capabilities of the cores are available may comprise checking respective processor identification(s) of the one or more multi-core processors.

Example 16 may be example 15, wherein retrieving the capabilities of the cores may comprise retrieving from respective registers of the cores.

Example 17 may be example 13, further comprising, on retrieval of the capabilities of the cores, forming, by the scheduler or the virtual machine monitor, one or more capability ordered core sets based at least in part on the capabilities of the cores.

Example 18 may be example 17, wherein on forming of the one or more capability ordered core sets, scheduling may comprise scheduling the plurality of execution threads or virtual machines for execution on selected one or ones of the capability ordered core sets, based at least in part on the capabilities of the capability ordered core sets and characteristics of the plurality of execution threads or priorities of the virtual machines.

Example 19 may be example 13, further comprising learning, by the scheduler, the characteristics of the plurality of execution threads.

Example 20 may be example 19, wherein scheduling may comprise scheduling, by the scheduler, execution threads that execute in a foreground with expected execution time in excess of an execution time threshold for execution in more capable cores or core sets.

Example 21 may be example 19, wherein scheduling may comprise scheduling, by the scheduler, execution threads with priorities in excess of a priority threshold for execution in more capable cores or core sets.

Example 22 may be example 19, wherein scheduling may comprise scheduling, by the scheduler, execution threads that perform pre-fetches in excess of a prefetch threshold in more capable cores or core sets.

Example 23 may be any one of examples 19-22, wherein on learning more about the characteristics the execution threads, scheduling may comprise scheduling based at least in part on the capabilities of the cores and the better understanding of the characteristics of the plurality of execution threads.

Example 24 may be any one of examples 13-22, wherein on receipt of one or more updates to one or more capabilities of one or more cores, scheduling may comprise scheduling based at least in part on the updated capabilities of the cores and characteristics of the plurality of execution threads or priorities of the virtual machines.

Example 25 may be one or more computer-readable media comprising instructions that cause a computing device, in response to execution of the instructions by one or more of a plurality of cores of one or more multi-core processors of the computing device, to provide a scheduler of an operating system or a virtual machine monitor to the computing device; wherein the plurality of cores have diverse capabilities; wherein the scheduler may retrieve capabilities of the cores, and schedule a plurality of execution threads for execution on selected one or ones of the cores, based at least in part on the capabilities of the cores and characteristics of the plurality of execution threads; and wherein the virtual machine monitor may retrieve capabilities of the cores, and schedule a plurality of virtual machines of the computing device for execution on selected one or ones of the cores, based at least in part on the capabilities of the cores and respective priorities of the virtual machines.

Example 26 may be example 25, wherein the scheduler or the virtual machine monitor may further determine, on start-up or reset of the computing device, whether capabilities of the cores are available to be retrieved, and on determination that the capabilities of the cores are available to be retrieved, perform the retrieval, and on retrieval of the core capabilities, perform the scheduling based at least in part on the capabilities of the cores and characteristics of the plurality of execution threads or priorities of the virtual machines.

Example 27 may be example 26, wherein the scheduler or the virtual machine monitor may determine whether capabilities of the cores are available by checking respective processor identification(s) of the one or more multi-core processors.

Example 28 may be example 27, wherein the scheduler or the virtual machine monitor may retrieve the capabilities of the cores from respective registers of the cores.

Example 29 may be example 25, wherein the scheduler or the virtual machine monitor on retrieval of the capabilities of the cores, may form one or more capability ordered core sets based at least in part on the capabilities of the cores.

Example 30 may be example 29, wherein on formation of the one or more capability ordered core sets, the scheduler or the virtual machine monitor may schedule the plurality of execution threads or virtual machines for execution on selected one or ones of the capability ordered core sets, based at least in part on the capabilities of the capability ordered core sets and characteristics of the plurality of execution threads or priorities of the virtual machines.

Example 31 may be example 25, wherein the scheduler may further learn the characteristics of the plurality of execution threads.

Example 32 may be example 31, wherein the scheduler may schedule execution threads that execute in a foreground with expected execution time in excess of an execution time threshold for execution in more capable cores or core sets.

Example 33 may be example 31, wherein the scheduler may schedule execution threads with priorities in excess of a priority threshold for execution in more capable cores or core sets.

Example 34 may be example 31, wherein the scheduler may schedule execution threads that perform pre-fetches in excess of a prefetch threshold in more capable cores or core sets.

Example 35 may be any one of examples 31-34, wherein on learning more about the characteristics the execution threads, the scheduler may perform the scheduling based at least in part on the capabilities of the cores and the better understanding of the characteristics of the plurality of execution threads.

Example 36 may be any one of examples 25-34, wherein on receipt of one or more updates to one or more capabilities of one or more cores, the scheduler or the virtual machine monitor may perform the scheduling based at least in part on the updated capabilities of the cores and characteristics of the plurality of execution threads or priorities of the virtual machines.

Example 37 may be an apparatus for computing, comprising: first means for retrieving capabilities of a plurality of cores of one or more multi-processor cores of the apparatus, wherein the plurality of cores have diverse capabilities; and second means for scheduling a plurality of execution threads of the apparatus for execution on selected one or ones of the cores, based at least in part on the capabilities of the cores and characteristics of the plurality of execution threads, or third means for scheduling a plurality of virtual machines of the apparatus for execution on selected one or ones of the cores, based at least in part on the capabilities of the cores and priorities of the virtual machines.

Example 38 may be example 37, wherein the second or third means may further comprise means for determining, on start-up or reset of the apparatus, whether capabilities of the cores are available to be retrieved, and on determining that the capabilities of the cores are available to be retrieved, performing the retrieval; wherein the second or third means, on retrieval of the core capabilities, perform the scheduling based at least in part on the capabilities of the cores and characteristics of the plurality of execution threads or priorities of the virtual machines.

Example 39 may be example 38, wherein the means for determining whether capabilities of the cores are available may comprise means for checking respective processor identification(s) of the one or more multi-core processors.

Example 40 may be example 39, wherein the first means may comprise means for retrieving from respective registers of the cores.

Example 41 may be example 37, wherein the first means may further comprise means for forming, on retrieval of the capabilities of the cores, one or more capability ordered core sets based at least in part on the capabilities of the cores.

Example 42 may be example 41, wherein the second or third means, on forming of the one or more capability ordered core sets, schedules the plurality of execution threads or virtual machines for execution on selected one or ones of the capability ordered core sets, based at least in part on the capabilities of the capability ordered core sets and characteristics of the plurality of execution threads or priorities of the virtual machines.

Example 43 may be example 37, wherein the second means may further comprise means for learning the characteristics of the plurality of execution threads.

Example 44 may be example 43, wherein the second means schedules execution threads that execute in a foreground with expected execution time in excess of an execution time threshold for execution in more capable cores or core sets.

Example 45 may be example 43, wherein the second means schedules execution threads with priorities in excess of a priority threshold for execution in more capable cores or core sets.

Example 46 may be example 43, wherein the second means schedules execution threads that perform pre-fetches in excess of a prefetch threshold in more capable cores or core sets.

Example 47 may be any one of examples 43-46, wherein the second means, on learning more about the characteristics the execution threads, schedules based at least in part on the capabilities of the cores and the better understanding of the characteristics of the plurality of execution threads.

Example 48 may be any one of examples 37-46, wherein the first or second means, on receipt of one or more updates to one or more capabilities of one or more cores, schedules based at least in part on the updated capabilities of the cores and characteristics of the plurality of execution threads or priorities of the virtual machines.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computing, comprising:
one or more multi-core processors, each having a plurality of cores, with at least two of the plurality of cores having different capabilities; and
either a scheduler of an operating system or a virtual machine monitor;
wherein the scheduler is to retrieve or receive capabilities of the cores, and schedule a plurality of execution threads for execution on selected ones of a first plurality of capability ordered core sets, based at least in part on the capabilities of the first core sets and characteristics of the plurality of execution threads;
wherein the virtual machine monitor is to retrieve or receive capabilities of the cores, and schedule a plurality of virtual machines of the apparatus for execution on selected ones of a second plurality of capability ordered core sets, based at least in part on the capabilities of the second core sets and respective priorities of the virtual machines; and
wherein the scheduler or the virtual machine monitor on retrieval of the capabilities of the cores, is to form the first or second plurality of capability ordered core sets, with at least a first and a second core set, based at least in part on the capabilities of the cores, where the first core set having N cores is collectively more capable than the second core set having N-1 cores, N being an integer greater than 2, and the first and second core sets having at least one common core.

2. The apparatus of claim 1, wherein the scheduler or the virtual machine monitor is to further determine, on start-up or reset of the apparatus, whether capabilities of the cores are available to be retrieved, and on determination that the capabilities of the cores are available to be retrieved, perform the retrieval, and on retrieval of the core capabilities, form the first or second core sets, perform the scheduling based at least in part on the capabilities of the first or second core sets and characteristics of the plurality of execution threads or priorities of the virtual machines.

3. The apparatus of claim 2, wherein the scheduler or the virtual machine monitor is to determine whether capabilities of the cores are available by checking respective processor identification(s) of the one or more multi-core processors.

4. The apparatus of claim 3, wherein the scheduler or the virtual machine monitor is to retrieve the capabilities of the cores from respective model specific registers (MSR) of the cores.

5. The apparatus of claim 1, wherein the scheduler is to further learn the characteristics of the plurality of execution threads.

6. The apparatus of claim 5, wherein the scheduler is to schedule execution threads that execute in a foreground with an expected execution time in excess of an execution time threshold for execution in more capable cores or core sets.

7. The apparatus of claim 5, wherein the scheduler is to schedule execution threads with priorities in excess of a priority threshold for execution in more capable cores or core sets.

8. The apparatus of claim 5, wherein the scheduler is to schedule execution threads that perform pre-fetches in excess of a prefetch threshold in more capable cores or core sets.

9. The apparatus of claim 5, wherein on learning more about the characteristics of the execution threads, the scheduler is to perform the scheduling based at least in part on the capabilities of the first or second core sets and a better understanding of the characteristics of the plurality of execution threads.

10. The apparatus of claim 1, wherein on receipt of one or more updates to one or more capabilities of one or more cores, the scheduler or the virtual machine monitor is to perform the scheduling based at least in part on the updated capabilities of the first or second core sets and characteristics of the plurality of execution threads or priorities of the virtual machines.

11. A method for computing, comprising:
retrieving or receiving, by a scheduler of an operating system or a virtual machine monitor of a computing device, capabilities of a plurality of cores of one or more multi-core processors of the computing device, from respective designated control registers of the cores, wherein at least two of the plurality of cores have different capabilities; and
forming, by the scheduler or the virtual machine monitor, a plurality of capability ordered core sets, with at least a first and a second core set, based at least in part on the capabilities of the cores, where the first core set having N cores is collectively more capable than the second core set having N-1 cores, N being an integer greater than 2, and the first and second core sets having at least one common core;
scheduling, by the scheduler, a plurality of execution threads for execution on selected ones of the capability ordered core sets, based at least in part on the capabilities of the core sets and characteristics of the plurality of execution threads, or scheduling, by the virtual machine monitor, a plurality of virtual machines of the computing device for execution on selected ones of the capability ordered core sets, based at least in part on the capabilities of the core sets and priorities of the virtual machines.

12. One or more non-transitory computer-readable media comprising instructions that cause a computing device, in response to execution of the instructions by one or more of a plurality of cores of one or more multi-core processors of the computing device, to provide a scheduler of an operating system or a virtual machine monitor to the computing device;
wherein at least two of the plurality of cores have different capabilities;
wherein the scheduler is to retrieve capabilities of the cores, from respective designated control registers of the cores, and schedule a plurality of execution threads for execution on selected ones of a first plurality of capability ordered core sets, based at least in part on the capabilities of the first core sets and characteristics of the plurality of execution threads; and
wherein the virtual machine monitor is to retrieve capabilities of the cores, and schedule a plurality of virtual machines of the computing device for execution on selected ones of a second plurality of capability ordered core sets, based at least in part on the capabilities of the second core sets and respective priorities of the virtual machines;
wherein the scheduler or the virtual machine monitor on retrieval of the capabilities of the cores, is to form the first or second plurality of capability ordered core sets, with at least a first and a second core set, based at least in part on the capabilities of the cores, where the first core set having N cores is collectively more capable than the second core set having N-1 cores, N being an integer greater than 2, and the first and second core set having at least one common core.

13. The non-transitory computer-readable media of claim 12, wherein the scheduler or the virtual machine monitor is to further determine, on start-up or reset of the computing device, whether capabilities of the cores are available to be retrieved, and on determination that the capabilities of the cores are available to be retrieved, perform the retrieval, and on retrieval of the core capabilities, perform the scheduling based at least in part on the capabilities of the first or second core sets and characteristics of the plurality of execution threads or priorities of the virtual machines.

14. The non-transitory computer-readable media of claim 13, wherein the scheduler or the virtual machine monitor is to determine whether capabilities of the cores are available by checking respective processor identification(s) of the one or more multi-core processors.

15. The non-transitory computer-readable media of claim 14, wherein the scheduler or the virtual machine monitor is to retrieve the capabilities of the cores from respective model specific registers (MSR) of the cores.

16. The non-transitory computer-readable media of claim 12, wherein the scheduler is to further learn the characteristics of the plurality of execution threads.

17. The computer-readable media of claim 16, wherein the scheduler is to schedule execution threads that execute in a foreground with an expected execution time in excess of an execution time threshold for execution in more capable cores or core sets.

18. The non-transitory computer-readable media of claim 16, wherein the scheduler is to schedule execution threads with priorities in excess of a priority threshold for execution or execution threads that perform pre-fetches in excess of a prefetch threshold in more capable cores or core sets.

19. The non-transitory computer-readable media of claim 16, wherein on learning more about the characteristics the execution threads, the scheduler is to perform the scheduling based at least in part on the capabilities of the first core sets and a better understanding of the characteristics of the plurality of execution threads.

20. The non-transitory computer-readable media of 12, wherein on receipt of one or more updates to one or more capabilities of one or more cores, the scheduler or the virtual machine monitor is to perform the scheduling based at least in part on the updated capabilities of the second core sets and characteristics of the plurality of execution threads or priorities of the virtual machines.

* * * * *

UNITED STATES PATENT AND TRADEMARK OFFICE
CERTIFICATE OF CORRECTION

PATENT NO. : 10,372,493 B2
APPLICATION NO. : 14/978182
DATED : August 6, 2019
INVENTOR(S) : Vijay Dhanraj et al.

It is certified that error appears in the above-identified patent and that said Letters Patent is hereby corrected as shown below:

In the Claims

Column 18
Lines 45-46, "...characteristics the execution threads," should read "...characteristics of the execution threads,"

Signed and Sealed this
Nineteenth Day of November, 2019

Andrei Iancu
*Director of the United States Patent and Trademark Office*